US009307400B1

(12) United States Patent
Blinn et al.

(10) Patent No.: US 9,307,400 B1
(45) Date of Patent: Apr. 5, 2016

(54) SYSTEM AND METHOD OF EFFICIENT MOBILE DEVICE NETWORK BRAND CUSTOMIZATION

(71) Applicant: Sprint Communications Company L.P., Overland Park, KS (US)

(72) Inventors: Benjamin P. Blinn, Leawood, KS (US); Jagannath Ghoshal, Olathe, KS (US); Peter K. Mwangi, Overland Park, KS (US); Jason Rincker, Overland Park, KS (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/475,399

(22) Filed: Sep. 2, 2014

(51) Int. Cl.
*H04M 3/00* (2006.01)
*H04W 8/24* (2009.01)
*H04W 4/00* (2009.01)

(52) U.S. Cl.
CPC .............. *H04W 8/245* (2013.01); *H04W 4/003* (2013.01)

(58) Field of Classification Search
CPC ............................. H04W 8/245; H04W 4/003
USPC ......................................................... 455/418
See application file for complete search history.

(56) References Cited

U.S. PATENT DOCUMENTS

| | | |
|---|---|---|
| 6,131,024 A | 10/2000 | Boltz |
| 6,445,914 B1 | 9/2002 | Findikli et al. |
| 6,753,887 B2 | 6/2004 | Carolan et al. |
| 7,165,191 B1 | 1/2007 | Vakrat |
| 7,260,382 B1 | 8/2007 | Lamb et al. |
| 7,266,371 B1 | 9/2007 | Amin et al. |
| 7,493,111 B2 | 2/2009 | Knowles |
| 7,817,988 B2 | 10/2010 | Kruis et al. |
| 7,904,895 B1 | 3/2011 | Cassapakis et al. |
| 7,991,988 B2 | 8/2011 | Chen |

(Continued)

FOREIGN PATENT DOCUMENTS

| | | |
|---|---|---|
| GB | 2292047 A | 2/1996 |
| KR | 2006039974 A | 5/2006 |

(Continued)

OTHER PUBLICATIONS

Masterson, Michelle E., et al., "System and Methods for Deferred and Remote Device Branding", filed Jul. 16, 2014, International Serial No. PCT/US14/46773.

(Continued)

*Primary Examiner* — Tanmay Shah

(57) ABSTRACT

A mobile communication device. The device comprises a memory and a processor. The device further comprises an application stored in the memory that, when executed by the processor at initial set-up of the mobile communication device, responsive to no existing dynamic portion of the animation for the network brand identity, downloads the dynamic portion of the animation from a server through an internet protocol (IP) address link stored in the memory, wherein the dynamic portion is in the form of scalable vector graphics (SVG) and comprises vector transformation information of changing portions of the animation from frame to frame, wherein the dynamic portion of the animation comprises network brand specific objects of the animation and configuration parameters to change the background of the static portion based on the network brand identity of the mobile communication device.

14 Claims, 7 Drawing Sheets

(56) References Cited

U.S. PATENT DOCUMENTS

| | | |
|---|---|---|
| 8,107,926 B2 | 1/2012 | Goto |
| 8,185,097 B2 | 5/2012 | Vanderlinden et al. |
| 8,185,101 B1 | 5/2012 | Wiseman et al. |
| 8,249,654 B1 | 8/2012 | Zhu |
| 8,260,281 B2 | 9/2012 | Urbanek |
| 8,401,538 B2 | 3/2013 | Urbanek |
| 8,401,595 B2 | 3/2013 | Zhu et al. |
| 8,433,953 B1 | 4/2013 | Gaudette et al. |
| 8,442,521 B2 | 5/2013 | Fleischman et al. |
| 8,571,536 B2 | 10/2013 | Urbanek |
| 8,612,967 B1 | 12/2013 | Delker |
| 8,626,165 B1 | 1/2014 | Narasimhan et al. |
| 8,666,383 B1 | 3/2014 | Mauer et al. |
| 8,819,188 B2 | 8/2014 | Blatherwick et al. |
| 8,825,039 B2 | 9/2014 | Mizuguchi |
| 8,855,012 B1 | 10/2014 | Suri |
| 8,909,291 B1 | 12/2014 | Spanel et al. |
| 9,020,479 B1 | 4/2015 | Somayajula et al. |
| 9,026,105 B2 | 5/2015 | Shipley et al. |
| 9,042,877 B1 | 5/2015 | Ghoshal et al. |
| 9,098,368 B1 | 8/2015 | Delker |
| 9,100,769 B2 | 8/2015 | Annan et al. |
| 9,100,819 B2 | 8/2015 | Annan et al. |
| 9,125,037 B2 | 9/2015 | Masterson et al. |
| 9,143,924 B1 | 9/2015 | Abou-El-Ella et al. |
| 9,161,209 B1 | 10/2015 | Ghoshal et al. |
| 9,161,325 B1 | 10/2015 | Urbanek |
| 9,170,870 B1 | 10/2015 | Masterson et al. |
| 9,198,027 B2 | 11/2015 | Urbanek |
| 9,204,239 B1 | 12/2015 | Sumner |
| 9,204,286 B1 | 12/2015 | Annan et al. |
| 9,208,513 B1 | 12/2015 | Mauer et al. |
| 9,226,133 B1 | 12/2015 | Spanel et al. |
| 2002/0091931 A1 | 7/2002 | Quick, Jr. et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | O'Connor et al. |
| 2004/0116163 A1 | 6/2004 | Kim et al. |
| 2004/0137890 A1 | 7/2004 | Kalke |
| 2004/0137891 A1 | 7/2004 | Clark et al. |
| 2004/0261041 A1* | 12/2004 | Parakkuth et al. ............ 715/901 |
| 2005/0079855 A1 | 4/2005 | Jethi et al. |
| 2005/0085222 A1 | 4/2005 | Przybilski et al. |
| 2005/0119001 A1 | 6/2005 | Watanabe |
| 2005/0188262 A1 | 8/2005 | Rosenman et al. |
| 2005/0197098 A1 | 9/2005 | Trossen |
| 2006/0025151 A1 | 2/2006 | Karaoguz et al. |
| 2006/0135144 A1 | 6/2006 | Jothipragasam |
| 2006/0154651 A1 | 7/2006 | Knowles |
| 2006/0203722 A1 | 9/2006 | Oommen |
| 2006/0208071 A1 | 9/2006 | Chang et al. |
| 2006/0235944 A1 | 10/2006 | Haslam |
| 2006/0236325 A1 | 10/2006 | Rao et al. |
| 2006/0246949 A1 | 11/2006 | Gupta et al. |
| 2007/0004404 A1 | 1/2007 | Buckley et al. |
| 2007/0015538 A1 | 1/2007 | Wang |
| 2007/0082655 A1 | 4/2007 | Link et al. |
| 2007/0099599 A1 | 5/2007 | Smith et al. |
| 2007/0129057 A1 | 6/2007 | Xu et al. |
| 2007/0130156 A1 | 6/2007 | Tenhunen et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0155275 A1 | 6/2008 | Natarajan et al. |
| 2008/0167027 A1 | 7/2008 | Gautier et al. |
| 2008/0171532 A1 | 7/2008 | Shieh et al. |
| 2008/0225806 A1 | 9/2008 | Arian et al. |
| 2008/0281511 A1 | 11/2008 | Miyata |
| 2008/0300967 A1 | 12/2008 | Buckley et al. |
| 2008/0318547 A1 | 12/2008 | Ballou, Jr. et al. |
| 2009/0061840 A1 | 3/2009 | Fleischman et al. |
| 2009/0075592 A1 | 3/2009 | Nystrom et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156190 A1 | 6/2009 | Fisher |
| 2009/0156209 A1 | 6/2009 | Franklin et al. |
| 2009/0239518 A1 | 9/2009 | Feuillette |
| 2009/0247124 A1 | 10/2009 | de Atley et al. |
| 2009/0260004 A1 | 10/2009 | Datta et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |
| 2010/0159876 A1 | 6/2010 | Brown et al. |
| 2010/0161724 A1 | 6/2010 | Sathyan et al. |
| 2010/0167696 A1 | 7/2010 | Smith et al. |
| 2010/0192120 A1 | 7/2010 | Raleigh |
| 2010/0198939 A1 | 8/2010 | Raleigh |
| 2010/0203864 A1 | 8/2010 | Howard |
| 2010/0207742 A1 | 8/2010 | Buhot et al. |
| 2010/0222031 A1 | 9/2010 | Carolan et al. |
| 2010/0222047 A1 | 9/2010 | Vanderlinden et al. |
| 2010/0262638 A1 | 10/2010 | Fitzgerald |
| 2010/0291898 A1 | 11/2010 | Sanding et al. |
| 2010/0311404 A1 | 12/2010 | Shi et al. |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |
| 2011/0030062 A1 | 2/2011 | Hsu et al. |
| 2011/0035421 A1 | 2/2011 | Laird-McConnell et al. |
| 2011/0081885 A1 | 4/2011 | Sennett et al. |
| 2011/0119716 A1 | 5/2011 | Coleman, Sr. |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0173685 A1 | 7/2011 | Chai et al. |
| 2011/0202680 A1 | 8/2011 | Bells et al. |
| 2011/0202976 A1 | 8/2011 | Chow et al. |
| 2011/0208338 A1 | 8/2011 | Eteminan et al. |
| 2011/0208865 A1 | 8/2011 | Knowles et al. |
| 2011/0222404 A1 | 9/2011 | Watson et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0294484 A1 | 12/2011 | Martin et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0035989 A1 | 2/2012 | Abel et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0094684 A1 | 4/2012 | Reddy |
| 2012/0106509 A1 | 5/2012 | Klingenbrunn et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0158580 A1 | 6/2012 | Eram et al. |
| 2012/0203824 A1 | 8/2012 | Oommen |
| 2012/0208511 A1 | 8/2012 | Vanderlinden et al. |
| 2012/0230587 A1 | 9/2012 | Arseneau |
| 2012/0260095 A1 | 10/2012 | Von Hauck et al. |

(56) References Cited

U.S. PATENT DOCUMENTS

| | | | |
|---|---|---|---|
| 2012/0276872 A1 | 11/2012 | Knauth et al. | |
| 2012/0282891 A1 | 11/2012 | Mohammed et al. | |
| 2012/0282924 A1 | 11/2012 | Tagg et al. | |
| 2013/0010641 A1 | 1/2013 | Dinan | |
| 2013/0023235 A1 | 1/2013 | Fan et al. | |
| 2013/0031191 A1 | 1/2013 | Bott | |
| 2013/0031234 A1 | 1/2013 | Alfano et al. | |
| 2013/0041988 A1 | 2/2013 | Rodermund et al. | |
| 2013/0046951 A1 | 2/2013 | Jones | |
| 2013/0065578 A1 | 3/2013 | Raleigh et al. | |
| 2013/0072168 A1 | 3/2013 | Colucciello et al. | |
| 2013/0085914 A1 | 4/2013 | McPherson et al. | |
| 2013/0111461 A1 | 5/2013 | Zubas et al. | |
| 2013/0196647 A1 | 8/2013 | Raleigh et al. | |
| 2013/0198567 A1 | 8/2013 | Ahmed et al. | |
| 2013/0222395 A1* | 8/2013 | Blas, Jr. | 345/473 |
| 2013/0303142 A1* | 11/2013 | Burcham et al. | 455/418 |
| 2013/0310003 A1 | 11/2013 | Sadhvani et al. | |
| 2013/0311836 A1 | 11/2013 | Hurst et al. | |
| 2014/0045483 A1 | 2/2014 | Whidden | |
| 2014/0075567 A1 | 3/2014 | Raleigh et al. | |
| 2014/0080467 A1 | 3/2014 | Urbanek | |
| 2014/0099916 A1 | 4/2014 | Mallikarjunan et al. | |
| 2014/0113610 A1* | 4/2014 | Ramprasad et al. | 455/418 |
| 2014/0206313 A1 | 7/2014 | Spanel et al. | |
| 2014/0228012 A1 | 8/2014 | Annan et al. | |
| 2014/0228042 A1 | 8/2014 | Annan et al. | |
| 2014/0274032 A1 | 9/2014 | Shipley et al. | |
| 2014/0342715 A1 | 11/2014 | Gu et al. | |
| 2014/0373184 A1 | 12/2014 | Mahaffey et al. | |
| 2015/0017962 A1 | 1/2015 | Howard et al. | |
| 2015/0065105 A1 | 3/2015 | Masterson et al. | |
| 2015/0111564 A1 | 4/2015 | Urbanek | |
| 2015/0111565 A1 | 4/2015 | Urbanek | |

FOREIGN PATENT DOCUMENTS

| | | | |
|---|---|---|---|
| WO | 2012078753 | A1 | 6/2012 |
| WO | 2013169983 | A1 | 11/2013 |
| WO | 2014046814 | A1 | 3/2014 |
| WO | 2014113128 | A1 | 7/2014 |
| WO | 2014123758 | A1 | 8/2014 |
| WO | 2014123759 | A1 | 8/2014 |
| WO | 2014158430 | A1 | 10/2014 |
| WO | WO2015030945 | A1 | 3/2015 |
| WO | WO2015060965 | A2 | 4/2015 |

OTHER PUBLICATIONS

Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.
Koller, Gary D., et al., "Out of the Box Experience (OOBE) Country Choice Using Wi-Fi Layer Transmission," filed Oct. 31, 2014, U.S. Appl. No. 14/530,666.
First Action Interview Office Action dated Mar. 16, 2015, U.S. Appl. No. 13/468,028, filed May 9, 2013.
Office Action dated Mar. 2, 2015, U.S. Appl. No. 13/622,234, filed Sep. 18, 2012.
FAIPP Pre-Interview Communication dated Mar. 26, 2015, U.S. Appl. No. 14/522,586, filed Oct. 24, 2014.
FAIPP Pre-Interview Communication dated Apr. 8, 2015, U.S. Appl. No. 13/844,104, filed Mar. 15, 2013.
Notice of Allowance dated Mar. 20, 2015, U.S. Appl. No. 13/763,428, filed Feb. 8, 2013.
Notice of Allowance dated Mar. 26, 2015, U.S. Appl. No. 13/763,434, filed Feb. 8, 2013.
Notice of Allowance dated Jan. 22, 2015, U.S. Appl. No. 13/899,566, filed May 21, 2013.
FAIPP Pre-Interview Communication dated Apr. 15, 2015, U.S. Appl. No. 14/060,712, filed Nov. 20, 2013.
FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
FAIPP Pre-Interview Communication dated Mar. 10, 2015, U.S. Appl. No. 14/010,524, filed Aug. 27, 2013.
FAIPP Pre-Interview Communication dated Apr. 8, 2015, U.S. Appl. No. 14/157,507, filed Jan. 16, 2014.
Foreign Communication from a Related Counterpart—International Preliminary Report on Patentability, dated Apr. 2, 2015, PCT/US13/55023, filed on Aug. 15, 2013.
Delker, Jason R., et al. "Subscriber Identity Module (SIM) Card Initiation of Custom Application Launcher Installation on a Mobile Communication Device" filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
FAIPP Pre-Interview Communication dated Mar. 12, 2015, U.S. Appl. No. 13/972,827, filed Aug. 21, 2013.
Ghoshal, Jagannath, et al., "Multi-Step Mobile Device Initiation with Intermediate Partial Reset," filed Aug. 21, 2013, U.S. Appl. No. 13/972,827.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
Notice of Allowance dated Jun. 11, 2013, U.S. Appl. No. 13/752,386, filed Jan. 28, 2013.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.
First Action Interview Pre-Interview Communication dated Sep. 22, 2014, U.S. Appl. No. 13/468,028, filed May 9, 2013.
First Action Interview Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
First Action Interview Pre-Interview Communication dated Apr. 23, 2014, U.S. Appl. No. 13/622,234, filed Sep. 18, 2012.
Final Office Action dated Sep. 19, 2014, U.S. Appl. No. 13/622,234, filed Sep. 18, 2012.
Advisory Action dated Dec. 17, 2014, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Jul. 16, 2014, U.S. Appl. No. 13/744,861, filed Jan. 18, 2013.
Notice of Allowance dated Nov. 22, 2014, U.S. Appl. No. 13/744,861, filed Jan. 18, 2013.
First Action Interview Pre-Interview Communication dated Oct. 22, 2014, U.S. Appl. No. 13/763,428, filed Feb. 8, 2013.
First Action Interview Pre-Interview Communication dated Apr. 3, 2014, U.S. Appl. No. 13/763,434, filed Feb. 8, 2013.
Final Office Action dated Aug. 19, 2014, U.S. Appl. No. 13/763,434, filed Feb. 8, 2013.

(56) References Cited

OTHER PUBLICATIONS

Office Action dated Aug. 7, 2014, U.S. Appl. No. 13/831,504, filed Mar. 14, 2013.
Notice of Allowance dated Dec. 29, 2014, U.S. Appl. No. 13/831,504, filed Mar. 4, 2013.
First Action Interview Pre-Interview Communication dated Nov. 20, 2014, filed May 21, 2013.
Foreign Communication from a Related Counterpart—International Search Report and Written Opinion, dated Feb. 29, 2012, PCT/US2011/063736, filed Dec. 7, 2011.
Foreign Communication from a Related Counterpart Application, "Preliminary Report on Patentability", dated Jun. 20, 2013, PCT/US2011/063736 filed Dec. 7, 2011.
Foreign Communication from a Related Counterpart—International Search Report and Written Opinion, dated Jul. 24, 2013, PCT/US13/40278, filed May 9, 2013.
Foreign Communication from a Related Counterpart—International Search Report and Written Opinion, dated Nov. 14, 2013, PCT/US13/55023, filed on Aug. 15, 2013.
Foreign Communication From a Related Counterpart Application, International Search Report and Written Opinion dated Jan. 24, 2014, PCT/US13/68981 filed on Nov. 7, 2013.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
Foreign Communication from a Related Counterpart—International Search Report and Written Opinion, dated Jun. 3, 2014, PCT/US14/16650, filed on Feb. 16, 2014.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Delker, Jason R., "Loading Branded Media Outside System Partition", filed Oct. 30, 2013 U.S. Appl. No. 14/066,947.
Mauer, Brian D., et al., "Automatic Branding of Generic Applications", filed Jan. 10, 2013, U.S. Appl. No. 14/152,627.
Spanel, Robert L., et al., Patent Application entitled "Dynamic Remotely Managed SIM Profile" U.S. Appl. No. 14/522,586, filed Oct. 24, 2014.
Annan, Brandon C., et al., "System and Method of Branding and Labeling a Mobile Device", filed Mar. 15, 2013, U.S. Appl. No. 13/844,104.
Annan, Brandon C., et al., "Electronic Fixed Brand Labeling", filed Feb. 8, 2013, U.S. Appl. No. 13/763,443.
Ghoshal, Jagannath, et al., "Rebranding a Portable Electronic Device While Maintaining User Data", filed May 22, 2013, U.S. Appl. No. 13/899,567.
Ghoshal, Jagannath, et al., "System and Method for Retrofitting a Branding Framework into a Mobile Communication Device", filed May 21, 2013, U.S. Appl. No. 13/899,566.
Urbanek, Robert E., "Delivery of Branding Content and Customizations to a Mobile Communication Device", filed Oct. 23, 2013, U.S. Appl. No. 14/060,712.
Urbanek, Robert E., "Delivery of Branding Content and Customizations to a Mobile Communication Device", filed Sep. 22, 2014, International Serial No. PCT/US14/56778.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
FAIPP Pre-Interview Communication dated Jun. 2, 2015, U.S. Appl. No. 14/152,627, filed Jan. 10, 2013.
Notice of Allowance dated Jul. 7, 2015, U.S. Appl. No. 14/522,586, filed Oct. 24, 2014.
FAIPP Pre-Interview Communication dated Apr. 23, 2014, U.S. Appl. No. 13/763,443, filed Feb. 8, 2013.
First Action Interview Office Action dated Jun. 16, 2014, U.S. Appl. No. 13/763,443, filed Feb. 8, 2013.
Office Action dated Jun. 16, 2015, U.S. Appl. No. 13/899,567, filed May 22, 2013.
Notice of Allowance dated May 7, 2015, U.S. Appl. No. 13/972,827, filed Aug. 21, 2013.
Notice of Allowance dated May 29, 2015, U.S. Appl. No. 14/085,474, filed Nov. 20, 2013.
Notice of Allowance dated May 8, 2015, U.S. Appl. No. 14/010,518, filed Aug. 27, 2013.
Notice of Allowance dated Jul. 8, 2015, U.S. Appl. No. 14/010,522, filed Aug. 27, 2013.
Notice of Allowance dated Jun. 26, 2015, U.S. Appl. No. 14/010,523, filed Aug. 27, 2013.
Notice of Allowance dated Apr. 28, 2015, U.S. Appl. No. 14/010,524, filed Aug. 27, 2013.
Restriction Requirement dated May 21, 2015, U.S. Appl. No. 14/073,321, filed Nov. 6, 2013.
Amazon Kindle e-book reader, on public sale 2007, http://en.wikipedia.org/wiki/Amazon_Kindle. last accessed on Apr. 13, 2015.
Foreign Office Action dated Jul. 7, 2015, Japanese Application Serial No. 2013-543310, filed Jul. 7, 2015.
Notice of Allowance dated Aug. 6, 2015, U.S. Appl. No. 14/152,627, filed Jan. 10, 2013.
Notice of Allowance dated Jul. 15, 2015, U.S. Appl. No. 13/622,234, filed Sep. 18, 2012.
Notice of Allowance dated Jul. 16, 2015, U.S. Appl. No. 13/844,104, filed Mar. 15, 2013.
Final Office Action dated Aug. 10, 2015, U.S. Appl. No. 13/763,443, filed Feb. 8, 2013.
FAIPP Pre-Interview Communication dated Sep. 29, 2015, U.S. Appl. No. 14/163,035, filed Jan. 24, 2014.
FAIPP Pre-Interview Communication dated Aug. 20, 2015, U.S. Appl. No. 14/073,321, filed Nov. 6, 2013.
FAIPP Pre-Interview Communication dated Jul. 15, 2015, U.S. Appl. No. 14/163,041, filed Jan. 24, 2014.
FAIPP Pre-Interview Communication dated Sep. 21, 2015, U.S. Appl. No. 14/231,718, filed Mar. 31, 2014.
Foreign Communication From a Related Counterpart Application, International Preliminary Report on Patentability dated Jul. 30, 2015, PCT/US13/68981, filed on Nov. 7, 2013.
Foreign Communication From a Related Counterpart Application, International Preliminary Report on Patentability dated Aug. 20, 2015, PCT/US14/13936, filed on Jan. 30, 2014.
Foreign Communication From a Related Counterpart Application, International Preliminary Report on Patentability dated Aug. 20, 2015, PCT/US14/13939, filed on Jan. 30, 2014.
Foreign Communication From a Related Counterpart Application, International Preliminary Report on Patentability dated Sep. 24, 2015, PCT/US14/16650, filed on Feb. 16, 2014.

(56) References Cited

OTHER PUBLICATIONS

Dummies, "Power Modes on Your Kindle Paperwhite", http://dummies.com/how-to/content/power-modes-on-your-kindle-paperwhite.html, last accessed on Jul. 31, 2015.
Cushings, "Buy Your Kindle At Waterstones? You're Now Locked Into One Sceensaver . . . The Waterstones Logo", https://www.techdirt.com/articles/20121206/16014421285/buy-your-kindle-waterstones-youre-now-locked-into-one-screensaver-waterstones-logo.shtml, last accessed Aug. 3, 2015.
Wikipedia, Extended Display Identification Data, https://en.wikipedia.org/wiki/Extended_Display_Identification_Data, last accessed Aug. 5, 2015.
Final Office Action dated Nov. 4, 2015, U.S. Appl. No. 13/468,028, filed May 9, 2012.
Advisory Action dated Nov. 3, 2015, U.S. Appl. No. 13/763,443, filed Feb. 8, 2013.
Notice of Allowance dated Oct. 26, 2015, U.S. Appl. No. 13/899,567, filed May 22, 2013.
FAIPP Pre-Interview Communication dated Oct. 16, 2015, U.S. Appl. No. 14/060,712, filed Oct. 23, 2013.
FAIPP Pre-Interview Communication dated Nov. 2, 2015, U.S. Appl. No. 14/060,719, filed Oct. 23, 2013.
First Action Interview Office Action dated Dec. 14, 2015, U.S. Appl. No. 14/060,719, filed Oct. 23, 2013.
Notice of Allowance dated Nov. 4, 2015, U.S. Appl. No. 14/073,321, filed Nov. 6, 2013.
First Action Interview Office Action dated Oct. 16, 2015, U.S. Appl. No. 14/157,507, filed Jan. 16, 2014.
FAIPP Pre-Interview Communication dated Oct. 7, 2015, U.S. Appl. No. 14/075,687, filed Nov. 8, 2013.
FAIPP Pre-Interview Communication dated Nov. 19, 2015, U.S. Appl. No. 14/297,429, filed Jun. 5, 2014.
Urbanek, Robert E., "Generic Mobile Devices Customization Framework," filed Oct. 7, 2015, U.S. Appl. No. 14/877,215.
FAIPP Pre-Interview Communication dated Nov. 4, 2015, U.S. Appl. No. 14/619,677, filed Feb. 11, 2015.
Notice of Allowance dated Dec. 11, 2015, U.S. Appl. No. 14/619,677, filed Feb. 11, 2015.

* cited by examiner

SYSTEM AND METHOD OF EFFICIENT MOBILE DEVICE NETWORK BRAND CUSTOMIZATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices that are used for mobile voice and/or data communications based on wireless network connectivity, which can be provided by base stations known as cell towers or sites. Such electronic devices may be associated with an electronic serial number (ESN), a stock keeping unit (SKU) number, and other identifying information. Mobile telephones and similar electronic/communications devices may be packaged with operating manuals, warning documents, charging devices, and other accessories in a point-of-sale package suitable for distributing to end users. A plurality of point-of-sale packages, each containing an electronic device, may be shipped together to a retail store or business location. Electronic devices may be configured prior to shipping with unique packaging, hardware and software branding, features and functionality.

SUMMARY

In an embodiment, a mobile communication device is disclosed. The device comprises a memory, a processor, and an application stored in the memory that, when executed by the processor at initial set-up of the mobile communication device, determines whether or not a dynamic portion of a network brand startup animation exists on the mobile communication device based on a network brand identity of the mobile communication device, wherein a static portion of the network brand startup animation that is common to a plurality of network brands compatible with the mobile communication device is preloaded on the mobile communication device, wherein the static portion of the network brand startup animation comprises one frame of a static background of the animation. Responsive to no existing dynamic portion of the animation for the network brand identity, the application further downloads the dynamic portion of the animation from a server through an internet protocol (IP) address link stored in the memory, wherein the dynamic portion is in the form of scalable vector graphics (SVG) and comprises vector transformation information of changing portions of the animation from frame to frame, wherein the dynamic portion of the animation comprises network brand specific objects of the animation and configuration parameters to change the background of the static portion based on the network brand identity of the mobile communication device, whereby by superimposing the dynamic portion and the static portion, the animation is rebuilt at the mobile communication device.

In an embodiment, a method of updating a network brand startup animation on a mobile communication device is disclosed. The method comprises responsive to changing a first network brand identity of the mobile communication device to a second network brand identity, determining, by an application, whether or not a second dynamic portion of a second network brand startup animation exists on the mobile communication device based on the second network brand identity of the mobile communication device. The method further comprises responsive to no existing second dynamic portion of the second network brand startup animation for the second network brand identity, downloading, by the application, the second dynamic portion of the animation from a data store through an internet protocol (IP) address link stored in a memory of the mobile communication device, wherein the dynamic portion is in the form of scalable vector graphics (SVG) and comprises vector transformation information of changing portions of the animation from frame to frame, wherein the dynamic portion of the animation comprises network brand specific objects of the animation and configuration parameters to change a background of a static portion of the animation based on the second network brand identity of the mobile communication device, whereby the updating of the network brand startup animation is realized without requiring the use of a maintenance release (MR).

In an embodiment, a method of initializing network brand startup animation on a mobile communication device is disclosed. The method comprises determining whether or not a dynamic portion of a network brand startup animation exists on the mobile communication device based on a network brand identity of the mobile communication device at initial set-up of the mobile communication device, wherein a static portion of the network brand startup animation is preloaded on the mobile communication device, wherein the static portion of the network brand startup animation comprises one frame of a static background of the animation. The method further comprises responsive to no existing dynamic portion of the animation for the network brand identity, downloading the dynamic portion of the animation from a data store through a uniform resource locator (URL) link stored in the memory, wherein the dynamic portion is in a highly compressed format and comprises object transformation information and storing the dynamic portion of the animation.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
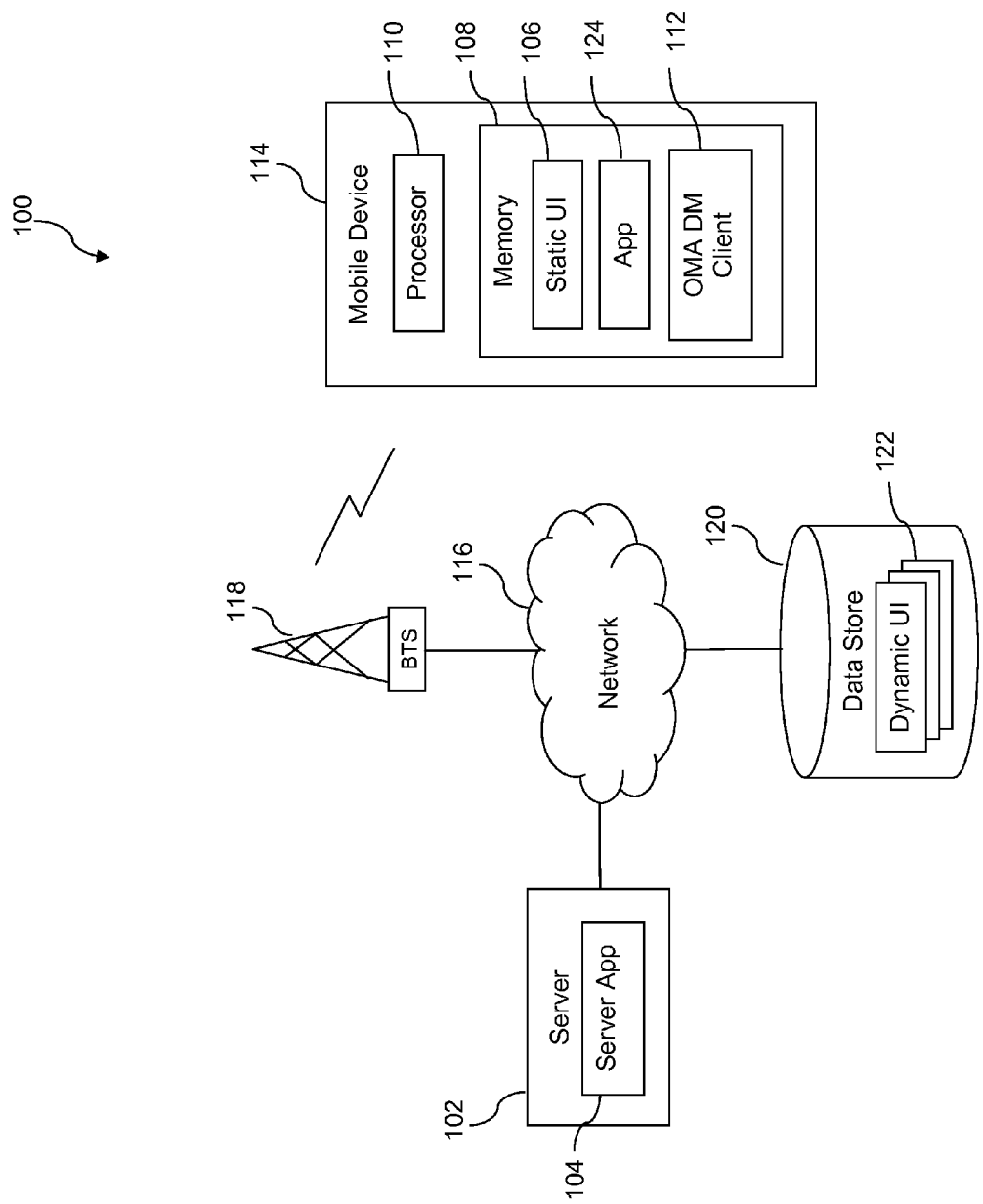
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Brand elements that support a plurality of different brands may be preloaded on a mobile communication device when the mobile communication device can change its brand to multiple brands. For example, visual elements, audio elements, widgets, and/or branded applications may be preloaded on the mobile communication device. The visual elements may comprise wallpapers/skins, interface controls, system startup visual effect, system turn off visual effect, videos, animations, or other visual content targeted for the mobile communication device. These brand elements, especially the visual elements, may be large in size. It may be space consuming to preload brand elements for multiple brands on the mobile communication device. The reason is that multiple versions of each of the plurality of brand elements may be preloaded on the mobile communication device, for example in a memory of the mobile communication device, with one version per brand.

Alternatively, selected brand elements associated with a specific brand may be downloaded by the mobile communication device at initial set-up or activation of the mobile communication device. It may then be bandwidth consuming to download the brand elements. For example, when no WiFi is available or when no high speed cellular data network is available to the mobile communication device, it may take hours or even up to days to download a large-sized video element. The present disclosure teaches a system and method for dividing each of a plurality of brand startup animations into a static portion and a network brand specific dynamic portion, preloading the static portion on the mobile communication device, and downloading a corresponding dynamic portion at initial set-up or activation of the mobile communication device based on the network brand identity of the mobile communication device.

For example, an application on a mobile communication device may determine whether or not a corresponding dynamic portion of a brand startup animation exists on the mobile communication device based on a brand identity of the mobile communication device at initial set-up or activation of the mobile communication device. A static portion of the brand startup animation may already be preloaded on the mobile communication device. The static portion of the brand startup animation may be common to a plurality of brands of the mobile communication device. Said in other words, each of the brand startup animations of the mobile communication device may be divided into a common static portion and a dynamic portion that is specific to the brand. The static portion may comprise one frame of a static background of the animation, and the dynamic portion may comprise brand specific objects of the animation. For example, brand startup animations may share the same background, and the background is encapsulated in the static portion. The dynamic portion may comprise vector transformation information of changing objects of the animation from frame to frame, for example a logo that changes in shape, size, and/or position. The dynamic portion may be in a highly compressed format, for example in the form of scalable vector graphics (SVG). The dynamic portion may be a small increment from the static portion and thus may be only in a small size. The dynamic portion of the animation may comprise configuration parameters to change the background of the static portion based on the brand identity of the mobile communication device.

When the corresponding dynamic portion of the animation for the brand identity is found by the application, the dynamic portion of the animation may send a notification to a graphics processing application on the mobile communication device. The graphics processing application may rebuild the brand startup animation based on the static portion and the dynamic portion of the animation. On the other hand, when no corresponding dynamic portion of the animation for the brand identity is found by the application, the dynamic portion of the animation may be downloaded by the application, for example from a data store through an internet protocol (IP) address link stored in the memory. The graphics processing application on the mobile communication device may rebuild the animation based on the dynamic portion and the static portion of the brand startup animation after the dynamic portion is downloaded to the mobile communication device, for example by superimposing the dynamic portion and the static portion.

When a brand startup animation is updated at the data store or when the brand identity of the mobile communication device is changed, an updated dynamic portion of the brand startup animation may be downloaded in a way similar to how the dynamic portion is downloaded at initial set-up of the mobile communication device.

By dividing a brand startup animation into a static portion and a dynamic portion, time and internet resources that may otherwise be used for downloading a brand startup animation as a whole every time may be saved. Or, memory that may otherwise be used to preload brand startup animations before the initial set-up of the mobile communication device may be saved. This way of managing brand startup animations may also be used for other large-sized elements which at least part of may be downloaded at the time of or after initial set-up of the mobile communication device.

Turning now to FIG. 1, a communication system 100 is described. In an embodiment, the communication system 100 comprises a plurality of mobile communication devices 114, a data store 120, and a server 102. The mobile device 114 may comprise a processor 110 and a memory 108. The memory 108 may comprise a preloaded static user interface (UI) 106, an open mobile alliance (OMA) device management (DM) client application 112, and an application 124. The data store 120 may comprise a plurality of dynamic UIs 122. The server 102 may comprise a server application 104. The data store 120 may be managed or manipulated by the server application 104. In an embodiment, the data store 120 may be a separate computer from the server computer 102 as shown in FIG. 1. In another embodiment, the data store 120 and the server computer 102 may locate in one and the same computer. The mobile device 114 may be configured to use a radio transceiver to establish a wireless communication link with a base transceiver station (BTS) 118, and the base transceiver station 118 may provide communications connectivity of the device 114 to a network 116. The mobile device 114 may also be configured to establish a wireless communication link with the network 116 through a WiFi access point (AP), for example using a wireless local area network (WLAN) radio transceiver. The server 102 and the data store 120 may also have access to the network 116. The network 116 may comprise any combination of private and public networks.

It is understood that the system 100 may comprise any number of mobile devices 114 and any number of servers 102. The collectivity of base transceiver stations 118 may be said to comprise a radio access network, in that these base transceiver stations 118 may provide a radio communication link to the mobile devices 114 to provide access to the network 116. The radio transceiver of the mobile communication device 114 may communicate with the base transceiver station 118 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The mobile communication device 114 may be any of a mobile phone, a personal digital assistant (PDA), a media player, a laptop computer, a tablet computer, a notebook computer, a wearable computer, a headset computer, or another network/communications capable device. In an embodiment, the mobile communication device 114 may have other components (not shown) such as a near field communication (NFC) radio transceiver, a short range radio transceiver such as a wireless local area network radio transceiver, or other components.

In an embodiment, the application 124 may be stored in the memory 108 of the mobile communication device 114. When executed by the processor 110 of the mobile communication device 114, the application 124 may perform a variety of functionality to download dynamic portions of brand startup animations, for example at initial set-up or activation of the mobile communication device 114, when a brand identity of the mobile communication device 114 is changed, or under some other predefined circumstance. A brand startup animation may be an animation playing at startup and/or shutdown of a mobile communication device 114. A brand startup animation may be divided into two portions: a static portion and a dynamic portion.

A static portion of the brand startup animation, a static UI 106, may be preloaded on the mobile communication device 114, for example in the memory 108 before initial power-up of the mobile communication device 114. A static portion of a brand startup animation may be referred to as a static UI 106 hereinafter. The static UI 106 may be device specific but may be common to a plurality of brands compatible with the mobile communication device 114. A mobile communication device 114 may be configured to be able to change into one of a selected plurality of brands under predefined circumstances, and so only the selected plurality of brands may be compatible with the mobile communication device 114. For example, the device 114 may be configured to be able to change to any of a Sprint, Boost Mobile, and Virgin Mobile network brand but not to an AT&T network brand.

In an embodiment, a brand may refer to a wireless communication service provider or a mobile communication device 114 network brand. For example, network brands associated with a mobile communication device 114 may be wireless communication service provider brands (e.g. Sprint, Boost Mobile, Virgin Mobile, or other). Network branding information may be presented on the mobile communication device 114, for example in a display of the device. The mobile communication device 114 may be configured to change into a brand or a specific wireless communication service provider based on a location, signal strength, choice by the user, or another factor. Throughout the present disclosure, the terms brand and a network brand may be interchangeable, and a network brand may be shortened to a brand in some contexts. Similarly, a brand identity and a network brand identity may be used interchangeably, and a network brand identity may be shortened to a brand identity in some contexts. It is understood throughout that the sense of brand and changing brands and changing branding elements refers consistently to network brands and network branding elements and not to mobile communication device brand (e.g., Samsung, Apple, LG, etc.).

The static UI 106 may vary from one mobile communication device 114 to another mobile communication device 114. However, the static UI 106 may stay the same for brands of the same mobile communication device 114. Said in other words, one mobile communication device 114 may comprise only one static UI 106. The background of a brand startup animation may stay unchanged from frame to frame. In an embodiment, the static UI 106 may comprise a static background of the brand startup animation. Thus, a brand startup animation may be divided into a static UI 106 and a dynamic UI 122. The dynamic UI 122 of a brand startup animation may comprise portions of the brand startup animation that do not stay the same from frame to frame. The static UI 106 may comprise one frame.

In an embodiment, the application 124 may search for a specific dynamic portion 122 on the mobile communication device 114 based on a brand identity of the mobile communication device 114 at initial set-up of the mobile communication device 114. The dynamic portion of a brand startup animation may be referred to as the dynamic UI 122 hereinafter. A specific dynamic UI 122 may be a dynamic UI 122 that is part of a brand startup animation corresponding to a brand identity of the mobile communication device 114. For example, when a mobile communication device 114 is turned on for the first time at the user side, the mobile communication device 114 may register with a service provider to be able to connect to a radio access network. The information of the service provider that the mobile communication device 114 may register with may be stored in the mobile communication device 114 as part of brand configuration. Brand experience of a brand may comprise visual elements, audio elements, widgets, and/or branded applications. The visual elements may comprise wallpapers/skins, interface controls, system startup visual effect, system turn off visual effect, videos, animations, or other visual content targeted for the mobile communication device 114. The system startup/turn off visual effect may comprise a startup/shutdown animation. Each brand of the mobile communication device 114 may have its own specific brand startup animation.

When the specific dynamic UI 122 is detected, the application 124 may send a notification to a graphics processing application, for example a graphics processing application executed by the processor 110 or a graphics processing application executed by a graphics processing unit (GPU). The graphics processing application may rebuild a brand startup animation based on the corresponding dynamic UI and the static UI. On the other hand, when the specific dynamic UI 122 is not detected on the mobile communication device 114, the application 124 may download the specific dynamic UI 122, for example from the data store 120.

For example, at initial set-up of the mobile communication device 114, the application 124 may determine whether or not a dynamic UI 122 of a brand startup animation exists on the mobile communication device 114 based on a brand identity of the mobile communication device 114. For example, a specific dynamic UI 122 of a corresponding brand startup animation may be denoted, marked, or labeled based on a corresponding brand identity of the mobile communication device 114, for example with an identification number. Thus, the application 124 may search for the specific dynamic UI 122 based on the brand identity of the mobile communication device 114.

When no corresponding dynamic UI 122 of the brand startup animation for a specific brand identity is found, the application 124 may download the dynamic UI 122 of the brand startup animation from the data store 120, for example through a link stored in the memory 108 that comprises an internet protocol (IP) address of the dynamic UI 122. For example, a list of links comprising internet protocol addresses for dynamic UIs 122 corresponding to brand identities of the mobile communication device 114 may be stored in the memory 108. Alternatively, the OMA DM client application 112 may download a link comprising an internet protocol address for a corresponding dynamic UI 122 to the mobile communication device 114 through an OMA DM payload at the initial set-up of the mobile communication device 114 based on the brand identity of the mobile communication device 114.

The OMA DM payload may be stored in the memory 108 outside the OMA DM client application 112 or within the OMA DM client application 112 in the memory 108. The application 124 may examine the memory 108 for the link comprising the internet protocol address for the dynamic UI 122 when no corresponding dynamic UI 122 is found in the memory 108. When the application 124 locates the link comprising the internet protocol address for the dynamic UI 122, the application 124 may download the dynamic UI 122 through the link comprising the internet protocol address or transmit a notification to the OMA DM client application 112 with the link comprising the internet protocol address included in the notification. The notification may request the OMA DM client application 112 to download the dynamic UI 122 through the corresponding link comprising the internet protocol address.

In an embodiment, the dynamic UI 122 may be in the form of scalable vector graphics (SVG). The dynamic UI 122 may vary from brand to brand on the same mobile communication device 114. For example, the dynamic UI 122 may comprise brand specific objects of the brand startup animation. For example, the dynamic UI 122 may comprise a logo that changes in shape, size, and/or position. The logo may be specific to a brand identity of the mobile communication device 114. The dynamic UI 122 may comprise vector transformation information of changing portions of the animation from frame to frame. For example, the dynamic UI 122 may comprise vector transformation information of the logo from frame to frame. The dynamic UI 122 may be a small increment from the static UI 106 and thus may be only in a small size. Additionally, the dynamic UI 122 may comprise configuration parameters to change the background of the static UI 106 based on the brand identity of the mobile communication device 114. In an embodiment, the color of the background of the brand startup animation may stay the same for frames of the same brand startup animation but may vary from one brand startup animation to another brand startup animation. The dynamic UI 122 may comprise configuration parameters to change the color of the background, for example the static UI 106, from brand to brand. The pre-loaded static UI 106 may also be in the form of scalable vector graphics. By superimposing the dynamic UI 122 and the static UI 106, the brand startup animation may be rebuilt at the mobile communication device 114.

When the brand identity of the mobile communication device 114 changes, for example when the brand identity of the mobile communication device 114 changes from a first brand identity to a second brand identity, the brand startup animation may be changed on the mobile communication device 114. For example, the application 124 may first examine the mobile communication device 114 to determine whether or not a second dynamic UI 122 of a second brand startup animation exists on the mobile communication device 114 based on the second brand identity of the mobile communication device 114 when the brand identity of the mobile communication device 114 changes from a first brand identity to a second brand identity. When the second dynamic UI 122 is found on the mobile communication device 114, the application 124 may transmit a notification to the graphics processing application so that the graphics processing application may rebuild the second brand startup animation based on the static UI 106 and the second dynamic UI 122.

When the second dynamic UI 122 of the second brand startup animation for the second brand identity is not detected on the mobile communication device 114, the application 124 may download the corresponding dynamic UI 122 from the data store 120, for example by transmitting a notification of downloading the second dynamic UI 122 to the OMA DM client application 112 with a link comprising an internet protocol address of the second dynamic UI 122 included in the notification. In an embodiment, the second dynamic UI 122 may be downloaded in a similar way as how the dynamic UI 122 was downloaded at the initial set-up of the mobile communication device 114.

Additionally, when a brand startup animation is changed on the data store 120, for example by the wireless communications service provider that maintains the wireless communications network supporting the mobile communication device 114, the brand startup animation may be changed on the mobile communication device 114. For example, when the static UI 106 is changed on the data store 120, the data store 120 may transmit a notification of the update on the static UI 106 to the mobile communication device 114, for example to the application 124 on the mobile communication device 114. Alternatively, the application 124 may periodically examine the data store 120 for any update on the static UI 106, for example every hour, every 12 hours, every 24 hours, or at some other periodic interval. When the static UI 106 is updated on the data store 120, the corresponding static UI 106 may be changed on the mobile communication device 114. For example, the application 124 may download the updated static UI 106 from the data store 120, for example by downloading it directly from the data store 120 or by transmitting a notification of downloading the updated static UI 106 to the OMA DM client application 112.

On the other hand, when the dynamic UI 122 of a brand startup animation is changed or updated by the server 102, the dynamic UI 122 may be changed or updated on the data store 120. The data store 120 may transmit a notification of the update on the dynamic UI 122 to the mobile communication device 114, for example to the application 124 on the mobile communication device 114. The application 124 may compare an identification number of the updated dynamic UI 122 on the data store 120 with the identification number of the dynamic UI 122 in use on the mobile communication device 114, for example the dynamic UI 122 associated with the brand identity of the mobile communication device 114. When the dynamic UI 122 with the same identification number is updated on the data store 120 as the dynamic UI 122 in use on the mobile communication device 114, the application 124 may update the dynamic UI 122 on the mobile communication device 114.

Alternatively, the application 124 may periodically examine the data store 120 for any update on the dynamic UI 122 with the same identification number as the dynamic UI 122 in use on the mobile communication device 114, for example every hour, every 12 hours, every 24 hours, or at some other periodic interval.

When the dynamic UI 122 is updated on the data store 120, the corresponding dynamic UI 122 may be changed on the mobile communication device 114. For example, the application 124 may download the updated dynamic UI 122 from the data store 120, for example by downloading it directly from the data store 120 through a link comprising an internet protocol address of the updated dynamic UI 122 or by transmitting a notification of downloading the updated dynamic UI 122, with the link comprising the internet protocol address included in the notification, to the OMA DM client application 112.

In an embodiment, the dynamic UI 122 of the brand startup animation may be stored on the mobile communication device 114, for example in the memory 108, after the dynamic UI 122 is downloaded to the mobile communication device 114 at the initial set-up of the mobile communication device 114, when the dynamic UI 122 is changed, or when the brand identity of the mobile communication device 114 is changed. Once the dynamic UI 122 associated with the suitable network brand is stored on the mobile communication device 114, every time the mobile communication device 114 powers on or powers off, the brand startup animation may be played. It should be noted that the updating of the brand startup animation may be realized without requiring the use of a maintenance release (MR), but instead may be accomplished through a device management application, for example through the OMA DM application 112.

Figure 2:
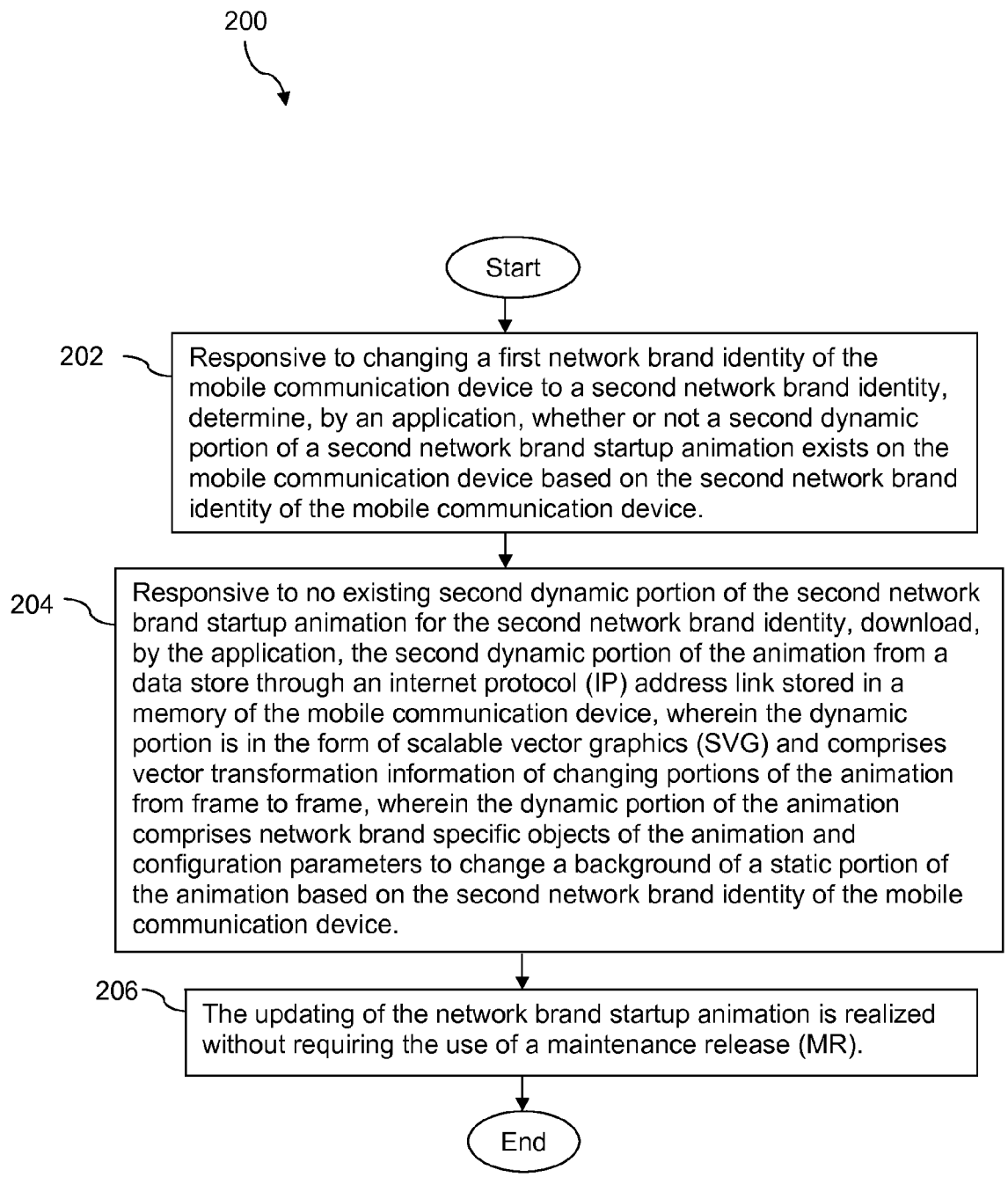
FIG. 2 is a flow chart illustrating a method according to an embodiment of the disclosure.

Turning now to FIG. 2, a method 200 is described. At block 202, responsive to changing a first network brand identity of the mobile communication device to a second network brand identity, it is determined, by an application, whether or not a second dynamic portion of a second network brand startup animation exists on the mobile communication device based on the second network brand identity of the mobile communication device. For example, when a brand identity of the mobile communication device 114 is changed from a first brand identity to a second brand identity, the application 124 may determine whether or not a second dynamic UI 122 of a second brand startup animation exists on the mobile communication device 114 based on the second brand identity of the mobile communication device 114.

At block 204, responsive to no existing second dynamic portion 122 of the second network brand startup animation for the second network brand identity, the second dynamic portion 122 of the animation is downloaded by the application 124 from a data store 120 through an internet protocol (IP) address link stored in a memory 108 of the mobile communication device 114, wherein the dynamic portion is in the form of scalable vector graphics (SVG) and comprises vector transformation information of changing portions of the animation from frame to frame, wherein the dynamic portion 122 of the animation comprises network brand specific objects of the animation and configuration parameters to change a background of a static portion 106 of the animation based on the second network brand identity of the mobile communication device 114. At block 206, the updating of the network brand startup animation is realized without requiring the use of a maintenance release (MR).

Figure 3:
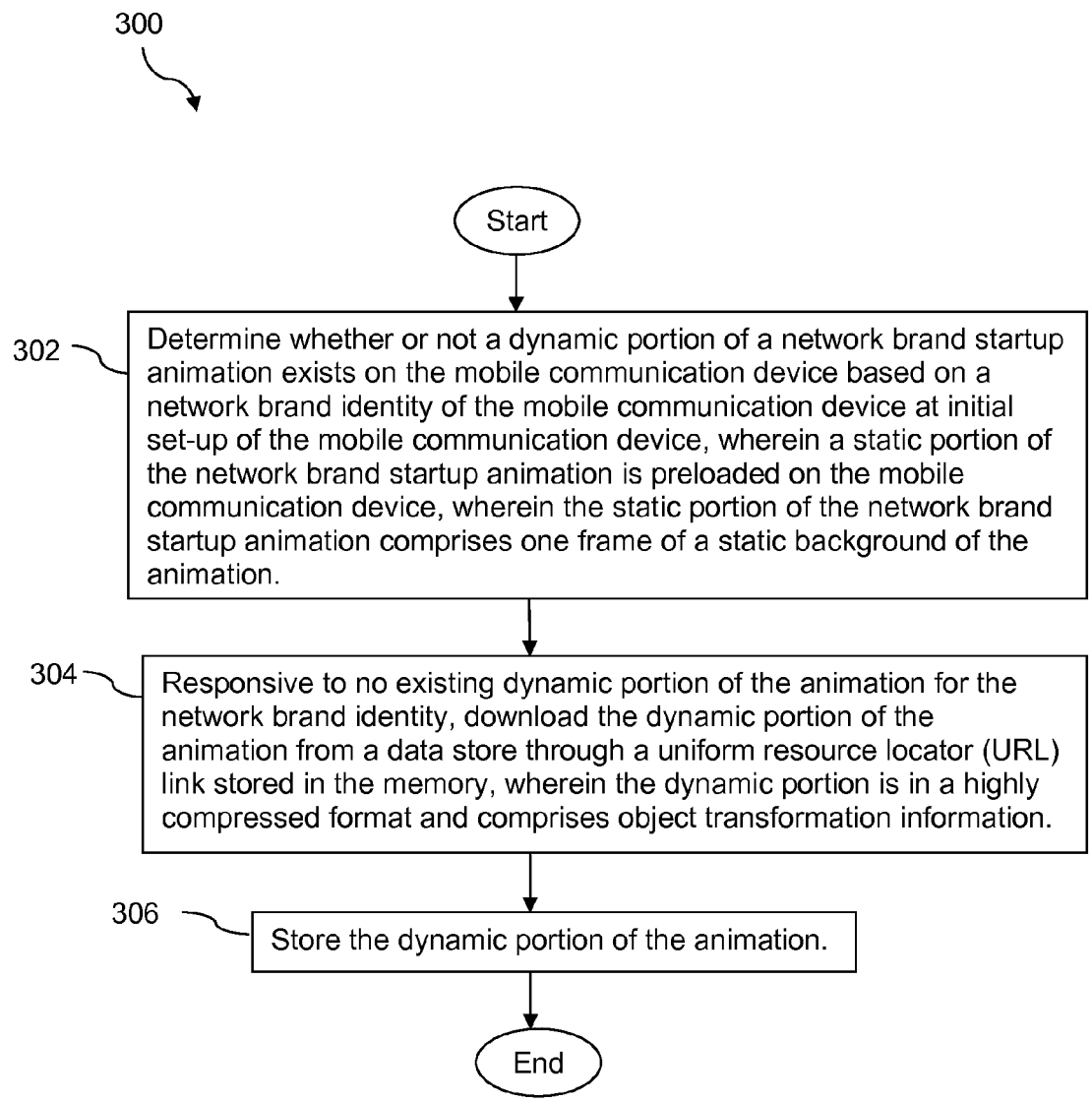
FIG. 3 is a flow chart illustrating another method according to an embodiment of the disclosure.

Turning now to FIG. 3, a method 300 is described. At block 302, it is determined whether or not a dynamic portion 122 of a network brand startup animation exists on the mobile communication device 114 based on a network brand identity of the mobile communication device 114 at initial set-up of the mobile communication device 114, wherein a static portion 106 of the network brand startup animation is preloaded on the mobile communication device 114, wherein the static portion 106 of the network brand startup animation comprises one frame of a static background of the animation.

At block 304, responsive to no existing dynamic portion 122 of the animation for the network brand identity, the dynamic portion 122 of the animation is downloaded from a data store 120 through a uniform resource locator (URL) link stored in the memory 108, wherein the dynamic portion 122 is in a highly compressed format and comprises object transformation information. At block 306, the dynamic portion 122 of the animation is stored.

Figure 4:
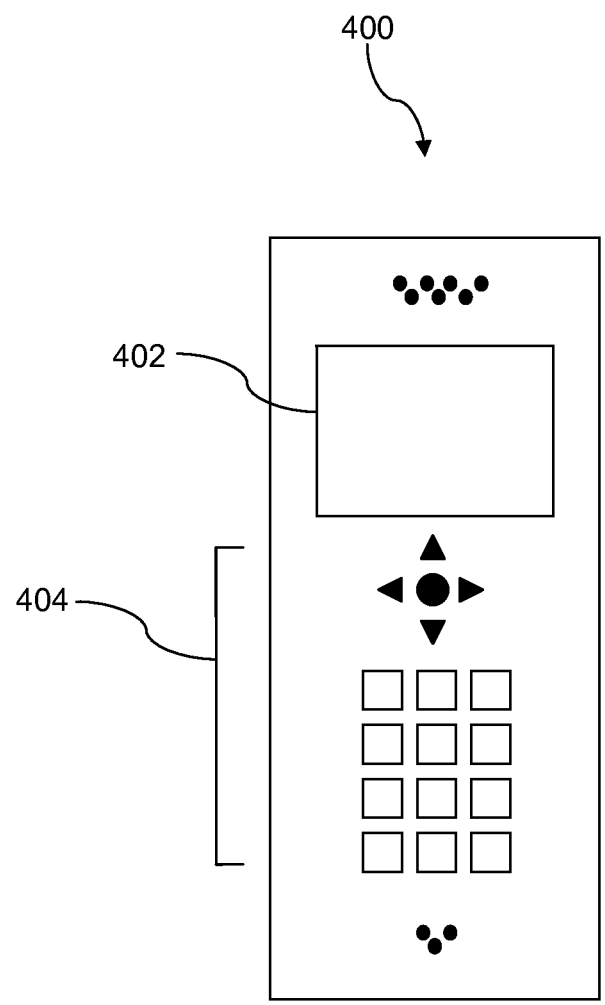
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
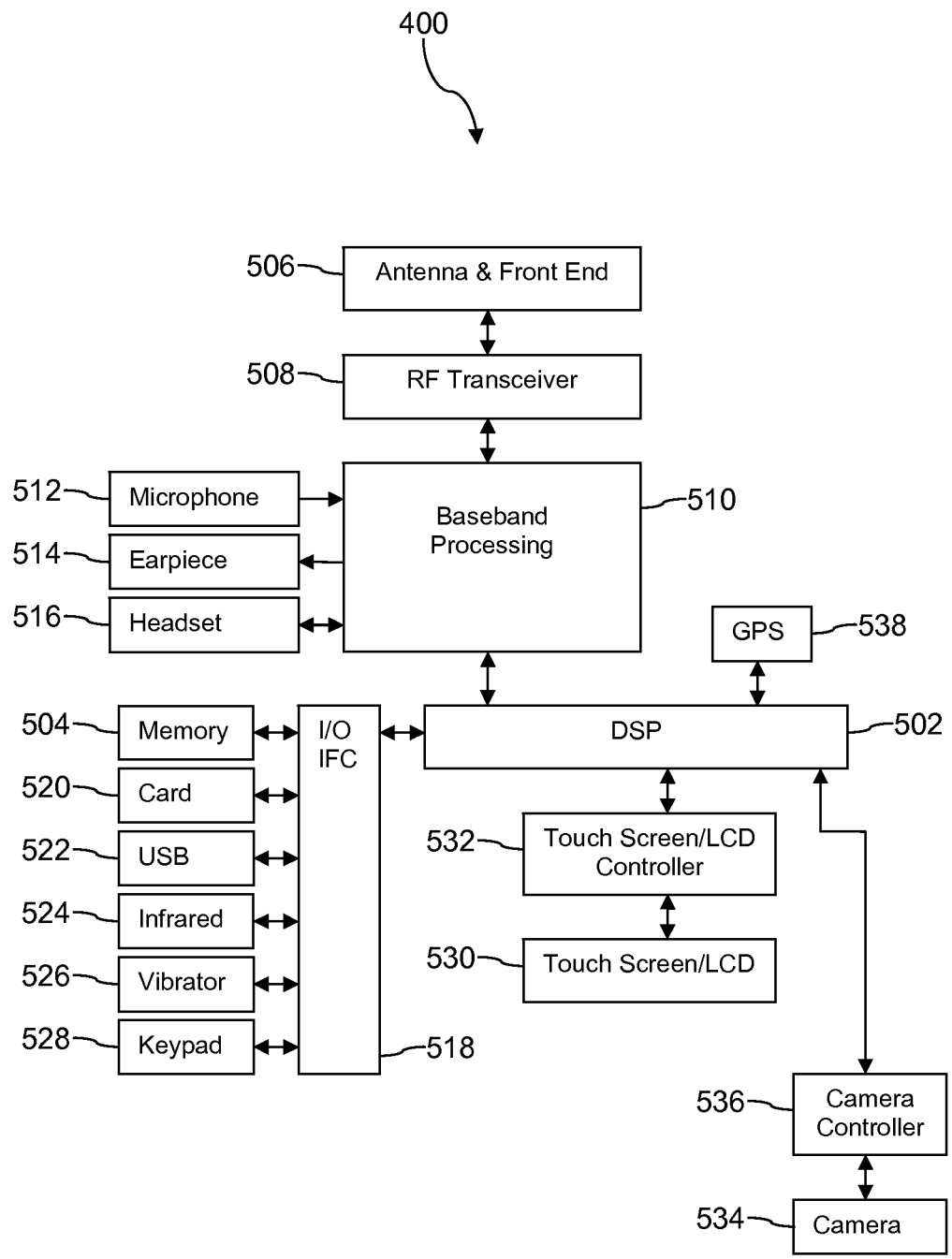
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
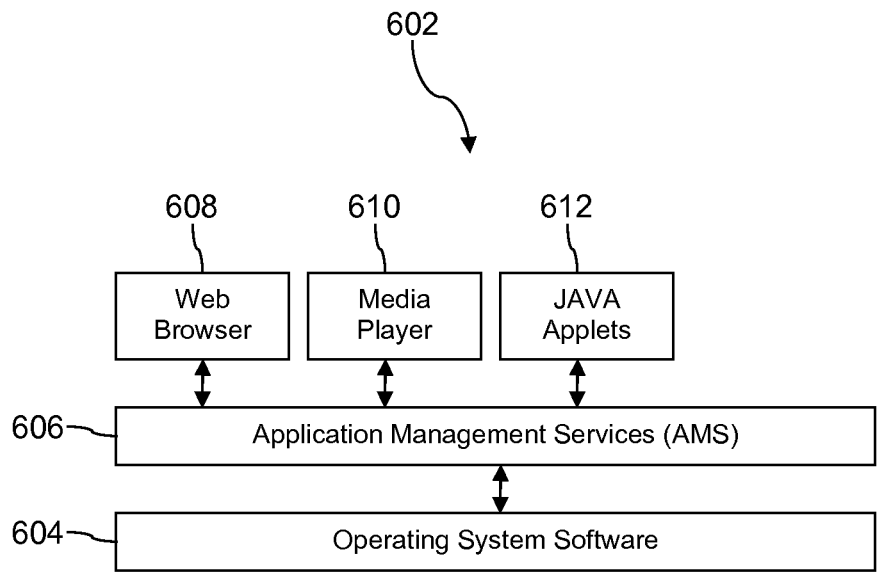
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
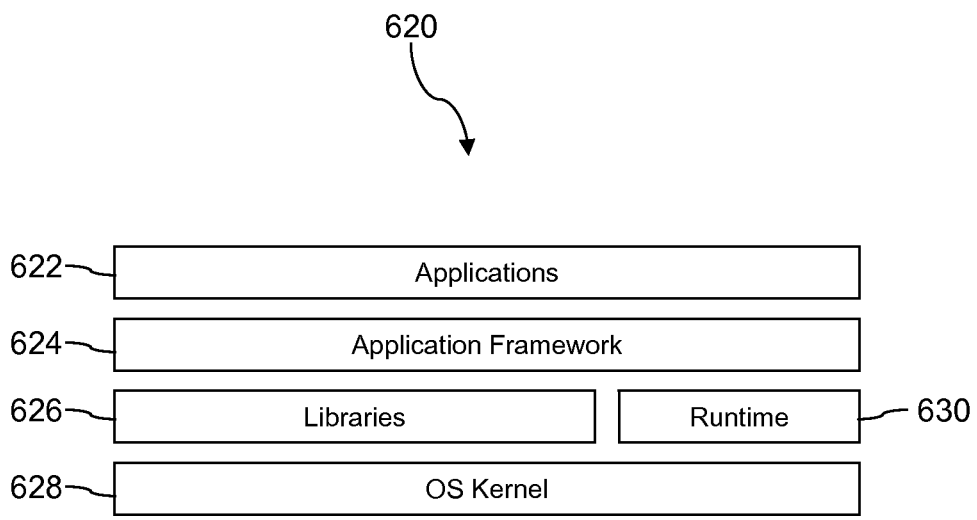
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
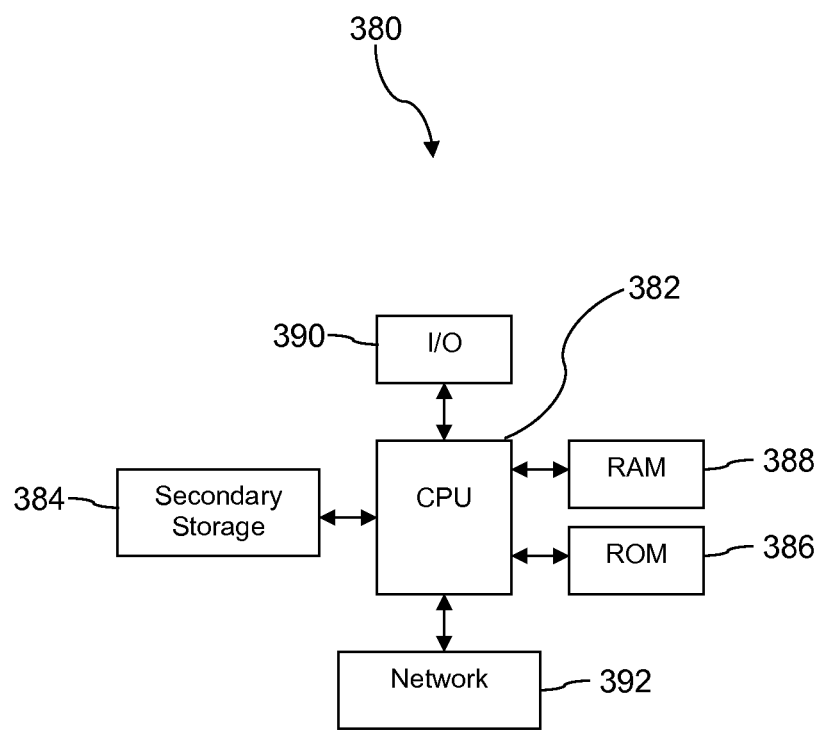
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device configured to initialize network brand startup animation, comprising:
   a non-transitory memory comprising a pre-loaded static portion of a network brand startup animation, wherein the pre-loaded static portion is common to a plurality of network brands compatible with the mobile communication device and comprises one frame of a static background of the animation common to the plurality of network brands;
   a processor; and
   an application stored in the memory that, when executed by the processor at initial set-up of the mobile communication device,
      determines whether a dynamic portion of the network brand startup animation exists on the mobile communication device based on a network brand identity of the mobile communication device, and
      in response to a determination that the mobile communication device does not have the dynamic portion, from a server through an internet protocol (IP) address link stored in the non-transitory memory, wherein the dynamic portion is in the form of scalable vector graphics (SVG) and comprises vector transformation information of changing portions of the animation from frame to frame, and wherein the dynamic portion is associated with a particular network brand of the plurality of network brands and comprises network brand specific objects of the animation and configuration parameters to change the background of the pre-loaded static portion based on the network brand identity of the mobile communication device; and
   a graphics processing application stored in the non-transitory memory that, when executed by the processor or by a graphics processing unit;
      rebuilds the animation at the mobile communication device by combining the dynamic portion and the pre-loaded static portion in response to receiving a notification from the application.

2. The mobile communication device of claim 1, wherein a color of the background of the animation stays the same for frames of the same network brand startup animation.

3. The mobile communication device of claim 2, wherein a background color changes for a second network brand startup animation.

4. The mobile communication device of claim 1, wherein the internet protocol (IP) address link to download the dynamic portion of the network brand startup animation is received in a device management payload at the mobile communication device.

5. The mobile communication device of claim 1, wherein the pre-loaded static portion of the animation is in the form of scalable vector graphics (SVG).

6. The mobile communication device of claim 1, wherein the mobile communication device is one of a mobile phone, a personal digital assistant (PDA), a media player, a laptop computer, a tablet computer, a notebook computer, a wearable computer, or a headset computer.

7. The mobile communication device of claim 1, wherein the mobile communication device establishes a wireless communication with a radio access network according to a code division multiple access (CDMA) wireless communication protocol, a global system for mobile communication (GSM) wireless communication protocol, a long-term evolution (LTE) wireless communication protocol, or a world-wide interoperability for microwave access (WiMAX) wireless communication protocol.

8. A method of initializing network brand startup animation on a mobile communication device, comprising:
   determining, by an application stored on a non-transitory memory and executable by a processor, during an initial set-up of a mobile communication device, whether a dynamic portion of a network brand startup animation exists on the mobile communication device based on a network brand identity, wherein the non-transitory memory comprises a pre-loaded static portion of a network brand startup animation, and wherein the pre-loaded static portion is common to a plurality of network brands compatible with the mobile communication device and comprises one frame of a static background of the animation common to the plurality of network brands;
   in response to a determination that the mobile communication device does not have the dynamic portion, downloading, by the application, the dynamic portion from a server through an internet protocol address link stored in the memory, wherein the dynamic portion is in the form of scalable vector graphics and comprises vector transformation information of changing portions of the animation from frame to frame, and wherein the dynamic portion is associated with a particular network brand of the plurality of network brands and comprises network brand specific objects of the animation and configuration parameters to change the background of the pre-loaded static portion based on the network brand identity of the mobile communication device;
   sending, by the application, to a graphics processing application stored in the non-transitory memory and executable by the processor or by a graphics processing unit, a notification; and
   in response to receiving the notification from the application, rebuilding, by the graphics processing application, the animation at the mobile communication device by combining the dynamic portion and the pre-loaded static portion.

9. The mobile communication device of claim 8, wherein a color of the background of the animation stays the same for frames of the same network brand startup animation.

10. The mobile communication device of claim 9, wherein a background color changes for a second network brand startup animation.

11. The mobile communication device of claim 8, wherein the internet protocol address link to download the dynamic portion of the network brand startup animation is received in a device management payload at the mobile communication device.

12. The mobile communication device of claim 8, wherein the pre-loaded static portion of the animation is in the form of scalable vector graphics.

13. The mobile communication device of claim 8, wherein the mobile communication device is one of a mobile phone, a personal digital assistant, a media player, a laptop computer, a tablet computer, a notebook computer, a wearable computer, or a headset computer.

14. The mobile communication device of claim 8, wherein the mobile communication device establishes a wireless communication with a radio access network according to a code division multiple access wireless communication protocol, a global system for mobile communication wireless communication protocol, a long-term evolution wireless communication protocol, or a world-wide interoperability for microwave access wireless communication protocol.

\* \* \* \* \*